United States Patent Office
2,758,938
Patented Aug. 14, 1956

2,758,938

PAINT CONTAINING AN AMINO ACID FROM PROTEIN AND A PROCESS OF MAKING IT

William A. Monterman, Berwyn, Ill., assignor to International Minerals & Chemical Corporation, a corporation of New York No Drawing. Application March 18, 1953, Serial No. 343,229

8 Claims. (Cl. 106—263)

The instant invention relates to improved painting compositions. More particularly, it relates to a novel additive for paints.

Paints are generally a combination of a pigment or a mixture of pigments with certain liquids known as paint oils, vehicles, binders or varnishes.

Various paints have certain inherent advantages and disadvantages and the appearance and the service that the paint is expected to perform will affect the choice of pigments as well as vehicles. There are a number of ways in which paints fail to perform as desired, for example, upon standing and exposure to air, a film or skin is formed on the surface and the paint becomes difficult to mix thoroughly. Also with many paints it is very difficult for an inexperienced painter to produce a smooth neat surface without shadowing.

It is an object of the instant invention to provide improved painting compositions.

It is a further object of the instant invention to provide improved painting compositions which have the characteristics of easy brushability and are of easily handled consistency.

It is a further object of the instant invention to provide painting compositions which are easily applied to produce a neat smooth surface.

It is a further object of the instant invention to provide painting compositions which do not form readily a film or a skin in the cans upon exposure to the air, and with which the brushes remain soft and pliable at all times.

These and other objects of the instant invention will become more apparent upon a fuller understanding of the invention as herein set forth.

It has been discovered that by incorporating into paints a small amount of an amino acid-containing solution, such as a proteinaceous hydrolysate or a fraction of a proteinaceous hydrolysate or a solution containing at least six of the amino acids which are normally present in the hydrolysates of proteins, the resulting painting composition has improved characteristics. By the term "fraction of a proteinaceous hydrolysate," as used herein, is meant a proteinaceous hydrolysate solution from which substantial amounts of one or more of the amino acids initially present have been separated.

In one embodiment of the invention the amino acid-containing solution which is admixed with the paint is a hydrolysate fraction resulting from the removal of substantial amounts of tyrosine and/or of glutamic acid from a protein hydrolysate and which has been adjusted to a pH between about 5.0 and about 6.5. Sufficient amino acid-containing solution is added to the paint in order to suppress film formation on the paint when exposed to the atmosphere. The amino acid-containing solution, such as the protein hydrolysate or the fraction of protein hydrolysate which is admixed with paint generally has an amino acid content between about 25% by weight and about 45% by weight. Usually between about 1.5 ounces and about 4 ounces of the amino acid-containing solution is admixed with a gallon of paint, depending upon the consistency desired in the resulting painting composition.

The amino acid-containing solution which is used in accordance with the instant invention may be produced by hydrolyzing any protein such as wheat gluten, corn gluten, zein, soybean meal, linseed meal, blood meal, casein, flaxseed meal, and the like. A hydrolysate of a protein or a protein hydrolysate fraction resulting after the separation of humin and substantial amounts of one or more amino acids therefrom is admixed with the paint. In another embodiment of the invention, the amino acid-containing solution is prepared by combining into a synthetic mixture at least six of the amino acids which are constituents of natural protein hydrolysates. In the synthetic mixture it is preferred that a majority of the amino acids normally present in protein hydrolysates are present in the solution. The synthetic solution is adjusted to a pH between about 5 and about 6.5 if it does not have a pH within this range, and is adjusted, either by dilution or by concentration, to an amino acid content of between about 25% by weight and about 45% by weight.

Generally, in practicing the instant invention between about 1.5 ounces and about 4 ounces of the amino acid-containing solution is admixed per gallon of paint. This amount of a solution containing between about 25% by weight and about 45% by weight amino acid content is generally sufficient to suppress skin formation when the paint is exposed to the atmosphere. The amount added also depends upon the type of paint and the consistency desired. The volume of solution which is added depends upon the concentration of the amino acids in the solution. The concentration of amino acids in a protein hydrolysate, a hydrolysate fraction, or a synthetic solution which is admixed with the paint is preferably between about 32% by weight and about 40% by weight.

A paint of medium body generally requires between about 2.0 ounces and about 3.0 ounces per gallon of paint, preferably about 2.5 ounces of amino acid-containing solution is employed. Generally, a smaller amount of amino acid-containing solution is added to lighter bodied paints than is added to the medium bodied paints. For example, between about 1.5 ounces and about 2.5 ounces of amino acid-containing solution is admixed per gallon of the lighter bodied paints. A greater amount of amino acids are admixed with heavier bodied paints than are employed with the medium bodied paints. For example, between about 2.5 ounces and about 4.0 ounces of amino acid-containing solution is employed per gallon of paint. For most types of paints, preferably between about 2 ounces and about 3 ounces of solution having between about 32% by weight and about 40% by weight amino acid content, is admixed per gallon of paint.

In a specific embodiment of the instant invention a protein, such as gluten, is hydrolyzed in the conventional manner with a mineral acid nonoxidizing under the conditions obtaining, for example hydrochloric acid or sulfuric acid, and the pH of the hydrolysate is adjusted with alkali, for example with sodium hydroxide, to between about 5 and about 6.5. The adjusted hydrolysate is concentrated to between about 25% by weight and about 45% by weight amino acid content, preferably to between about 32% by weight and about 40% by weight amino acid content. Insoluble humin and other impurities are separated from the resulting hydrolysate, for example by filtration. Between about 1.5 ounces and about 4 ounces of the resulting hydrolysate is admixed per gallon of paint. The resulting paint contains between about 0.4% by weight and about 1.1% by weight amino acid content.

In a preferred embodiment of the instant invention between about 2 ounces and about 3 ounces of a protein hydrolysate fraction having a pH between about 5 and about 6.5 is admixed with a gallon of paint. An approximate analysis of a typical protein hydrolysate fraction produced in a conventional process for the production of glutamic acid as taught in U. S., 2,463,877 is as follows:

| | Per cent |
|---|---|
| Arginine | 1.90 |
| Aspartic acid | 1.10 |
| Cystine | 0.24 |
| Glutamic acid | 3.20 |
| Histidine | 0.23 |
| Isoleucine | 1.60 |
| Leucine | 1.00 |
| Lysine | 0.79 |
| Methionine | 0.31 |
| Phenylalanine | 2.40 |
| Threonine | 0.41 |
| Tyrosine | 0.49 |
| Valine | 2.40 |
| Other amino acids | 23.93 |
| Total amino acid content | 39.97 |

Protein hydrolysates and fractions of protein hydrolysates from other processes involving treatment of protein hydrolysates are also employed in practicing the instant process. A protein hydrolysate or a fraction from which substantial amounts of humin and one or more of the amino acids initially present in the hydrolysate have been separated are employed. In the preferred practice of the invention, the protein hydrolysate or fraction thereof added to the paint contains all or a majority of the amino acid constituents present in the protein hydrolysate the analysis of which is given above.

In another embodiment between about 1.5 ounces and about 4 ounces of a synthetic amino acid-containing solution is mixed with a gallon of paint. The amino acid solution is prepared by combining 12 or 13 of the individual amino acids which occur naturally in protein hydrolysates. The amino acids may be combined in about the same relative amounts as they occur naturally in protein hydrolysates or in protein hydrolysate fractions, or they may be combined in about equal amounts of each. For example, a solution is prepared containing the following amino acids: glutamic acid, lysine, histidine, tryptophane, proline, valine, leucine, isoleucine, methionine, cystine, tyrosine, and phenylalanine. The amino acid-containing solution is adjusted to a pH between about 5 and about 6.5 and is brought to an amino acid content of between about 25% by weight and about 45% by weight. The solution is then admixed with the paint.

When an amino acid-containing solution is admixed with paint in accordance with the instant invention, the resulting painting composition has improved characteristics. The paint can be applied with greater speed because of the ease of application of the paint to the surface. Heavy streaks of pigment due to poor matching by inexperienced painters are eliminated. The time required for drying of the instant painting compositions is generally slightly longer than the same paint to which no protein hydrolysate or fraction thereof has been added. However, upon drying the painted surfaces are smooth, neat, and hard. The paint brush remains soft and pliable over extended periods of time.

The instant painting compositions containing the amino acid-containing solution do not form a substantial amount of film or skin upon standing for prolonged periods, and separation into layers or sedimentation is minimized. The amino acid-containing solutions are added to all types of paint, and the word "paint" as used herein includes outside paints, enamels, varnishes, interior paints, such as flat, gloss, and semigloss finishes.

The following examples are presented in order to afford a clearer understanding of the instant invention, but it is distinctly understood that the examples are illustrative only and the invention is not limited thereto.

Example I

About 2.5 ounces of protein hydrolysate fraction from wheat gluten which had been adjusted to a pH of about 5.5 was admixed per gallon of a typical outside paint. The protein fraction had an analysis substantially the same as the one previously set forth. The resulting painting composition contained approximately the following ingredients:

| | |
|---|---|
| Carbonate white lead | 41.0 lbs. |
| Zinc oxide | 20.5 lbs. |
| Asbestine | 7.3 lbs. |
| Linseed oil | 25.8 lbs. |
| Turpentine and driers | 5.4 lbs. |
| Total | 100.0 lbs.=5.556 gallons |

Aqueous hydrolysate fraction _ 13.4 ozs.
(About 39% amino acid content.)

When the above painting composition was applied to the outside of a house, application was easy and a given amount of the painting composition spread further than the same amount of the paint which had not been treated with a hydrolysate fraction. Although the drying time was a little longer than with the conventional paint, after drying of the composition the surface was hard and of excellent appearance. Upon standing for a prolonged period, no substantial amount of skin was formed on the painting composition which was not used.

Example II

About 3 ounces per gallon of paint of an adjusted hydrolysate fraction similar to that described in Example I was admixed with a flat inside paint. The resulting painting fraction contained approximately the following ingredients:

| | Pounds |
|---|---|
| Titanium pigment | 48.6 |
| Mg silicate pigment | 15.4 |
| Treated oil varnish | 25.2 |
| Mineral spirits | 7.2 |
| Japan drier | 3.6 |
| Total | 100.0 |

Aqueous hydrolysate fraction ozs__ 16.7
(About 39% amino acid content.)

When this painting composition was applied to the interior of a house, the same characteristics noted for the painting composition of Example I were also observed with this composition.

Example III

About 2.3 ounces per gallon of paint of an adjusted hydrolysate fraction similar to that described in Example I was admixed with a casein interior paint. The resulting painting fraction contained approximately the following ingredients:

| | Pounds |
|---|---|
| Lithopone | 29.8 |
| Mica | 4.2 |
| Silicates | 22.6 |
| Casein | 5.8 |
| Soya protein | 2.6 |
| H₂O | 35.0 |
| Total | 100.0 |

Aqueous hydrolysate fraction ozs__ 12.8
(About 39% ammino acid content.)

When this painting composition was applied to the cement floor of a house, the same characteristics noted for the painting composition of Example I were also observed with this composition.

Having thus fully described and illustrated the character of the invention, what is desired to be secured and claimed by Letters Patent is:

1. A painting composition comprising a paint, ordinarily subject to skin formation, and a mixture of amino acids produced by hydrolysis of a protein with an inorganic acid, said mixture being in an amount to produce a paint composition containing between about 0.4% and about 1.1% by weight amino acid content.

2. A painting composition comprising a paint, ordinarily subject to skin formation, and a mixture of at least six amino acids produced by hydrolysis of a protein with an inorganic acid, said mixture being in an amount to produce a paint composition containing between about 0.4% and about 1.1% by weight amino acid content.

3. The painting composition of claim 2 in which the amino acids mixture is a wheat gluten acid hydrolyzate from which glutamic acid and tyrosine have been at least partially removed.

4. A process which comprises adding a solution of amino acids produced by hydrolysis of a protein with an inorganic acid, to a paint, ordinarily subject to skin formation, in an amount to produce a paint composition containing between about 0.4% and about 1.1% amino acid content by weight, said solution of amino acids having a pH of between about 5.0 and about 6.5.

5. A process which comprises adding a solution containing at least six amino acids, produced by hydrolysis of a protein with an inorganic acid to a paint, ordinarily subject to skin formation, in an amount to produce a paint composition containing between about 0.4% and about 1.1% amino acid content by weight, said solution of amino acids having a pH of between about 5.0 and about 6.5.

6. A process which comprises adding to a paint, ordinarily subject to skin formation, between about 1.5 ounces and about 4.0 ounces per gallon of paint of a solution containing at least six amino acids produced by hydrolysis of a protein with an inorganic acid, said solution of amino acids having a pH of between about 5.0 and about 6.5.

7. A process which comprises admixing with a paint, ordinarily subject to skin formation a hydrolyzate, obtained by hydrolysis of a gluten with an inorganic acid, to produce a painting composition containing between about 0.4% and about 1.1% by weight amino acid content, said hydrolyzate having a pH between about 5.0 and about 6.5.

8. A process which comprises admixing with a paint, ordinarily subject to skin formation a gluten hydrolyzate fraction, obtained by hydrolysis of a gluten with an inorganic acid followed by separation of tyrosine and glutamic acid therefrom, to produce a paint composition containing between about 0.4% and about 1.1% by weight amino acid content, said gluten hydrolyzate fraction having a pH between about 5.0 and about 6.5.

References Cited in the file of this patent

UNITED STATES PATENTS

| | | |
|---|---|---|
| 2,207,336 | Yanick | July 9, 1940 |
| 2,327,540 | McQuiston | Aug. 24, 1943 |
| 2,381,915 | Lent | Aug. 14, 1945 |
| 2,427,481 | Weible et al. | Sept. 16, 1947 |
| 2,584,123 | Gruenwald | Feb. 5, 1952 |